United States Patent
Lin

(10) Patent No.: US 11,841,761 B2
(45) Date of Patent: Dec. 12, 2023

(54) METHOD AND SYSTEM FOR TRACING ERROR OF LOGIC SYSTEM DESIGN

(71) Applicant: XEPIC CORPORATION LIMITED, Nanjing (CN)

(72) Inventor: Yang-Trung Lin, San Jose, CA (US)

(73) Assignee: XEPIC CORPORATION LIMITED, Nanjing (CN)

( * ) Notice: Subject to any disclaimer, the term of this patent is extended or adjusted under 35 U.S.C. 154(b) by 42 days.

(21) Appl. No.: 17/559,032

(22) Filed: Dec. 22, 2021

(65) Prior Publication Data

US 2023/0176941 A1 Jun. 8, 2023

(30) Foreign Application Priority Data

Dec. 8, 2021 (CN) .......................... 202111491365.5

(51) Int. Cl.
*G06F 11/07* (2006.01)
*G06F 11/16* (2006.01)

(52) U.S. Cl.
CPC ........ *G06F 11/079* (2013.01); *G06F 11/0706* (2013.01); *G06F 11/1608* (2013.01)

(58) Field of Classification Search
CPC ............... G06F 11/0706; G06F 11/079; G06F 11/1604; G06F 11/1608; G06F 11/1679
See application file for complete search history.

(56) References Cited

U.S. PATENT DOCUMENTS

2010/0088257 A1 4/2010 Lu et al.
2020/0394576 A1* 12/2020 Fan .................... G06Q 10/0633

FOREIGN PATENT DOCUMENTS

CN  102467583 A  5/2012
CN  111709133 A  9/2020

* cited by examiner

*Primary Examiner* — Joseph R Kudirka
(74) *Attorney, Agent, or Firm* — ANOVA LAW GROUP, PLLC

(57) ABSTRACT

A method for tracing an error of a logic system design includes obtaining an assertion failure of a combinational cone of the logic system design, the combinational cone including a plurality of sub-cones; and obtaining machine learning models of the sub-cones. Each sub-cone represents a sub-circuitry of the logic system design and has one or more input signals and an output signal. The assertion failure indicates an actual signal value of the combinational cone at a current clock cycle being different from an expected output value at the current clock cycle. The method also includes: performing backtracing on the sub-cones according to the assertion failure, the machine learning models of the sub-cones, and dynamic backtracing sensitivities corresponding to the sub-cones, to obtain a backtracing result; and outputting one or more target sub-cones as candidate root causes of the assertion failure according to the backtracing result.

17 Claims, 8 Drawing Sheets

US 11,841,761 B2

METHOD AND SYSTEM FOR TRACING ERROR OF LOGIC SYSTEM DESIGN

CROSS REFERENCE TO RELATED APPLICATION

This application claims priority to Chinese Patent Application No. 202111491365.5, filed Dec. 8, 2021, which is incorporated herein by reference in its entirety.

TECHNICAL FIELD

The present disclosure relates to a field of integrated circuit and, more particularly, to a method and system for tracing an error of a logic system design.

BACKGROUND

With increased size of Integrated Circuit (IC) designs nowadays, it takes much longer time to identify a root cause of an incorrect value at a given circuit node. An incorrect value can be caused by any sub-circuitry of the IC that leads to the given circuit node, and the number of potential mal-functioning sub-circuitries can be large, making it harder to identify the root cause of the error. Existing circuit error tracing method requires logic modeling of each node of the circuit, such as a library cell or a sub-circuitry.

SUMMARY

In accordance with the disclosure, there is provided a method for tracing an error of a logic system design. The method includes obtaining an assertion failure of a combinational cone of the logic system design, the combinational cone including a plurality of sub-cones; and obtaining machine learning (ML) models of plurality of the sub-cones. Each sub-cone represents a sub-circuitry of the logic system design and has one or more input signals and an output signal. The assertion failure indicates an actual signal value of the combinational cone at a current clock cycle being different from an expected output value at the current clock cycle. Each sub-cone has a corresponding ML model trained to predict a value of the output signal of the sub-cone according to values of the one or more input signals of the sub-cone. The method also includes: performing backtracing on the plurality of sub-cones according to the assertion failure, the machine learning models of plurality of the sub-cones, and dynamic backtracing sensitivities corresponding to the plurality of sub-cones, to obtain a backtracing result; and outputting one or more target sub-cones as candidate root causes of the assertion failure according to the backtracing result.

Also in accordance with the disclosure, there is provided a computing system for tracing an error of a logic system design, including a memory and a processor coupled to the memory. The processor is configured to obtain an assertion failure of a combinational cone of the logic system design, the combinational cone including a plurality of sub-cones; and obtaining machine learning (ML) models of the plurality of sub-cones. Each sub-cone represents a sub-circuitry of the logic system design and having one or more input signals and an output signal, and the assertion failure indicates an actual signal value of the combinational cone at a current clock cycle being different from an expected signal value at the current clock cycle. Each sub-cone has a corresponding ML model trained to predict a value of the output signal of the sub-cone according to values of the one or more input signals of the sub-cone. The processor is further configured to: perform backtracing on the plurality of sub-cones according to the assertion failure, the machine learning models of the plurality of sub-cones, and dynamic backtracing sensitivities (DBS) corresponding to the plurality of sub-cones, to obtain a backtracing result; and output one or more target sub-cones as candidate root causes of the assertion failure according to the backtracing result.

Also in accordance with the disclosure, there is provided a non-transitory computer readable storage medium storing computer instructions. The computer instructions, when executed by a processor, cause the processor to perform: obtaining an assertion failure of a combinational cone of the logic system design, the combinational cone including a plurality of sub-cones; and obtaining machine learning (ML) models of the plurality of sub-cones. Each sub-cone represents a sub-circuitry of the logic system design and having one or more input signals and an output signal, and the assertion failure indicates an actual signal value of the combinational cone at a current clock cycle being different from an expected signal value at the current clock cycle. Each sub-cone has a corresponding ML model trained to predict a value of the output signal of the sub-cone according to values of the one or more input signals of the sub-cone. The computer instructions also cause the processor to perform backtracing on the plurality of sub-cones according to the assertion failure, the machine learning models of the plurality of sub-cones, and dynamic backtracing sensitivities (DBS) corresponding to the plurality of sub-cones, to obtain a backtracing result; and output one or more target sub-cones as candidate root causes of the assertion failure according to the backtracing result.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Example embodiments will be described with reference to the accompanying drawings, in which the same numbers refer to the same or similar elements unless otherwise specified.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Figure 1:
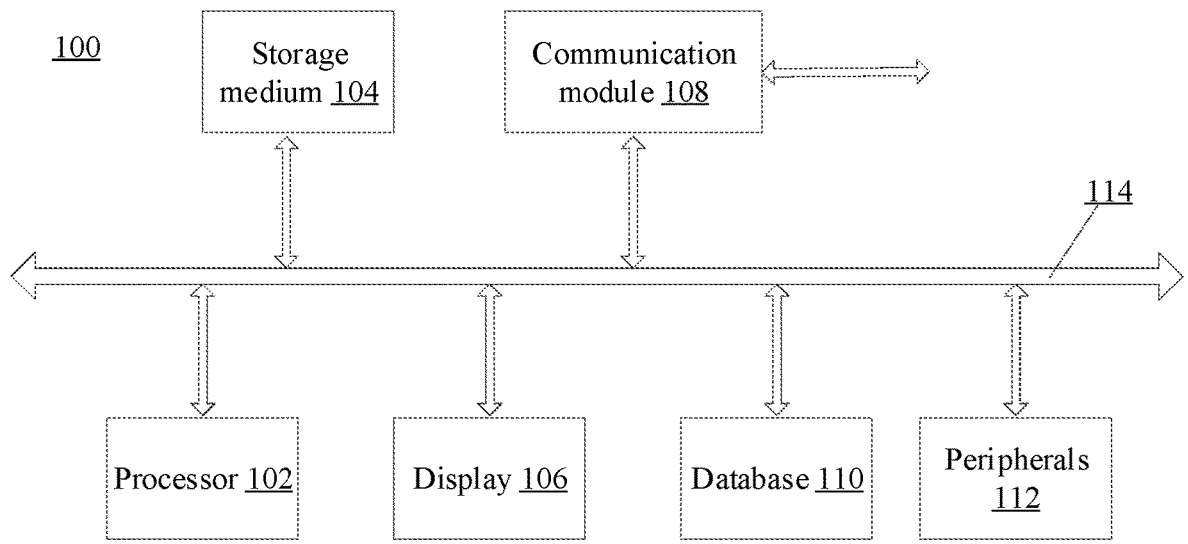
FIG. 1 is a block diagram of an exemplary computing system according to some embodiments of the present disclosure.

The present disclosure provides a circuit error tracing method and apparatus. FIG. 1 is a block diagram of an exemplary computing system 100 according to some embodiments of the present disclosure. As shown in FIG. 1, computing system 100 may include a processor 102 and a storage medium 104. According to certain embodiments, the computing system 100 may further include a display 106, a communication module 108, additional peripheral devices 112, and one or more bus 114 to couple the devices together. Certain devices may be omitted and other devices may be included.

The processor 102 may include any appropriate processor(s). In certain embodiments, the processor 102 may include multiple cores for multi-thread or parallel processing, and/or graphics processing unit (GPU). The processor 102 may execute sequences of computer program instructions to perform various processes, such as performing circuit error backtracing for a logic system design, training machine learning models for sub-circuitries, etc. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. The storage medium 104 may store computer programs for implementing various processes, when executed by the processor 102. The storage medium 104 may also include one or more databases for storing certain data such as operation data of logic cones, trained ML models corresponding to sub-circuitries, directed graph corresponding to the logic system design, and certain operations can be performed on the stored data, such as database searching and data retrieving.

The communication module 108 may include network devices for establishing connections through a network. The display 106 may include any appropriate type of computer display device or electronic device display. The peripherals 112 may include additional I/O devices, such as a controller, a keyboard, and so on.

In operation, the processor 102 may be configured to execute instructions stored on the storage medium 104 and perform various operations related to circuit error tracing method as detailed in the following descriptions.

A circuit is designed to produce an expected output signal when given a plurality of input signals. When an element in the circuit malfunctions, an error caused by the malfunctioned element may propagate along a path originating from the element and ending at an output node of the circuit, causing a value of an actual output signal of the circuit at a certain clock cycle being different from the expected output signal based on the circuit design. Conventionally, a debug team is required to manually review all waveforms of input nodes and output nodes that are possibly related to the error, causing a great amount of workload to the debug team. It can be understood that a value of any signal at a clock cycle discussed in embodiments of the present disclosure is either 0 or 1. The present disclosure provides a method of identifying a root cause of a circuit error when given a circuit design modeled as a directed graph and trained machine learning models of nodes in the directed graph. The method of the disclosure can significantly reduce a possible root cause of the circuit error to a limited scope, by means of introducing machine learning technologies into the verification and debugging of a logic system design.

Figure 2:
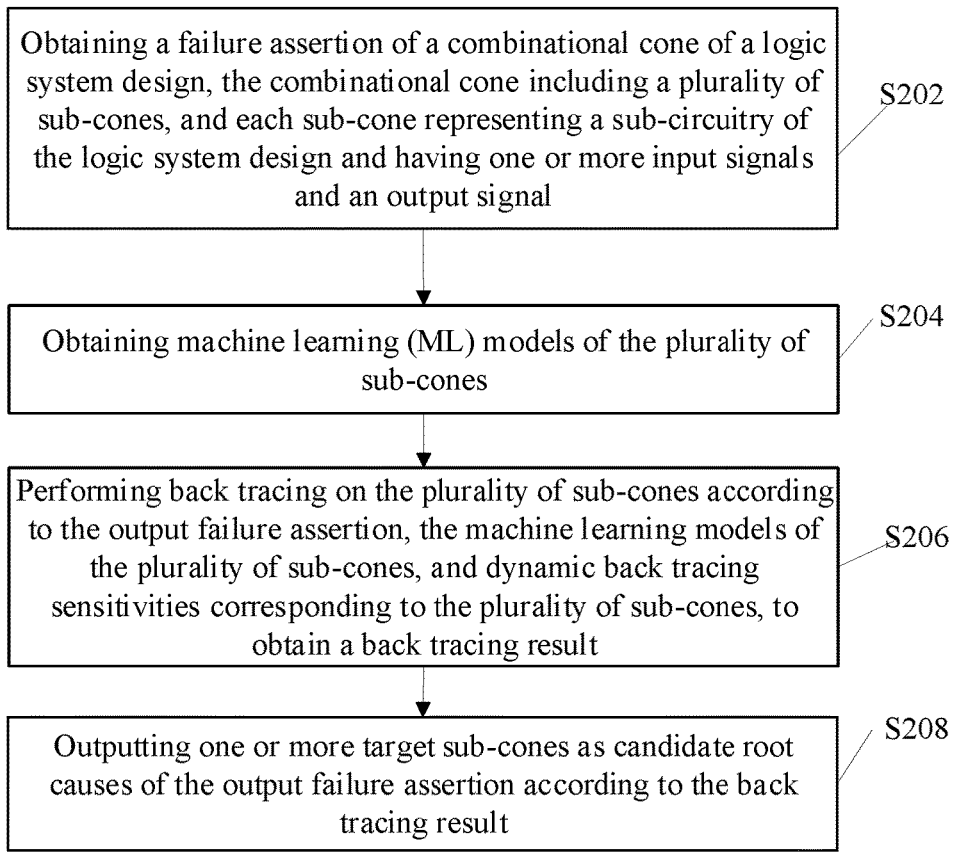
FIG. 2 is a schematic flow chart of a process for tracing an error of a logic system design according to some embodiments of the present disclosure.

FIG. 2 is a schematic flow chart of a method for tracing an error of a logic system design according to some embodiment of the disclosure. The method can be implemented by any suitable computing device, such as the system 100 shown in FIG. 1. The method can include steps as follows.

At S202, an assertion failure of a combinational cone of a logic system design can be obtained. The combinational cone includes a plurality of sub-cones, each sub-cone representing a sub-circuitry of the logic system design and having one or more input signals and an output signal. A directed graph of the logic system design can be used to describe the sub-cones as nodes and describe connection relationships among the sub-cones as node connections. The assertion failure indicates an actual signal value of the combinational cone at a current clock cycle being different from an expected signal value at the current clock cycle. For example, an output assertion failure indicates an actual output value $y(t)$ of the combinational cone at a clock cycle t being different from an expected output value $y^E(t)$ at the clock cycle t. An example assertion failure may be denoted as $y(t)==y^E(t)$ fails. In addition, values of the one or more input signals and the output signal of each sub-cone corresponding to the clock cycle t are obtained. In some embodiments, the error of the logic system design may be a bug introduced into Design Under Test (DUT) or Test Bench (TB). In some embodiments, the directed graph is derived from a register-transfer level (RTL) and/or a netlist of the logic system design.

Figure 3:
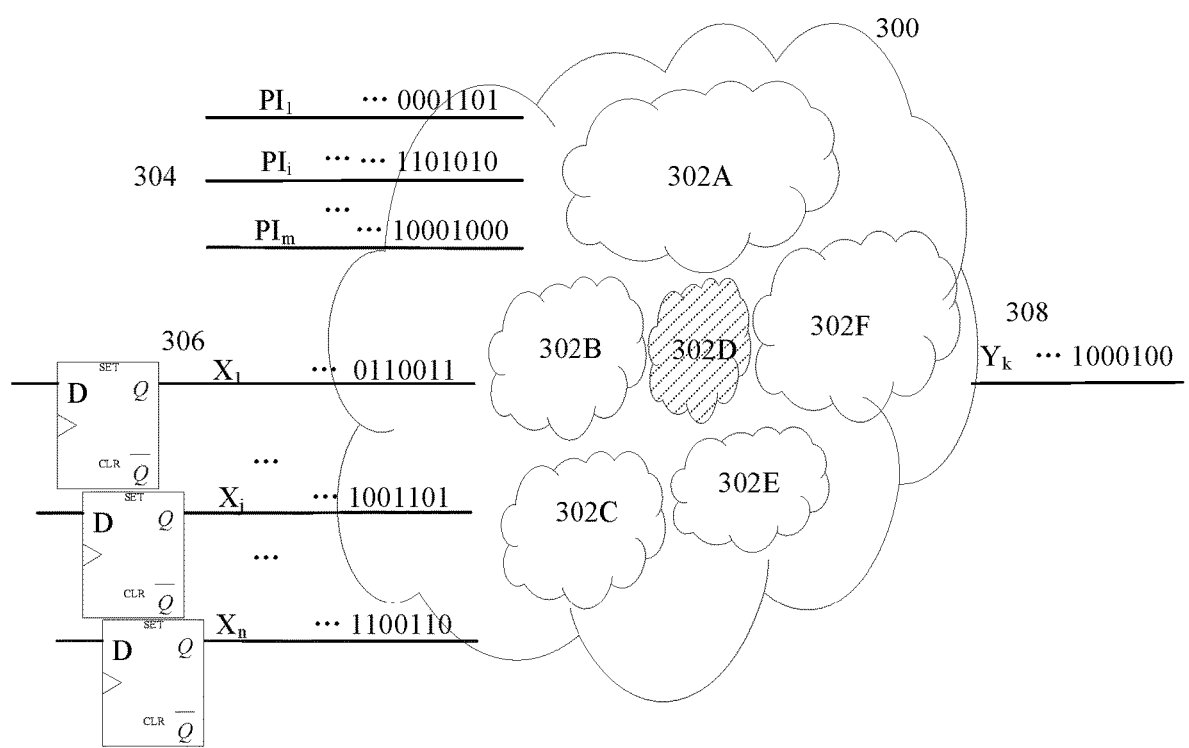
FIG. 3 is a schematic diagram illustrating a combinational cone according to some embodiments of the present disclosure.

FIG. 3 is a schematic diagram illustrating a combinational cone 300 according to some embodiment of the disclosure. Combinational cone 300 can be part of a logic system design (not shown). The logic system design may represent a software design or a hardware design, such as an Integrated Circuit (IC). As shown in FIG. 3, the combinational cone 300 includes a plurality of connected sub-cones, such as 302A through 302F. Connection relationships among the sub-cones are not shown in the figure. Each sub-cone represents a sub-circuitry of the logic system design 300 and may also be called as a logic cone. The sub-cone may include one or more logic gates. The logic system design 300 can be described and modelled by a directed graph having a plurality of nodes, each node of the directed graph represents one of the sub-cones, and the nodes are connected according to the connection relationships among the sub-cones. Accordingly, a sub-cone may also be referred to as a node. Primary input signals 304 of the logic system design 300 are denoted as $PI_1, \ldots PI_i, \ldots, PI_m$. Register signals 306 corresponding to the logic system design 300 are denoted as $X_1, \ldots X_j, \ldots, X_n$. Each register outputs a value stored at a previous clock cycle. The register may be a flip flop or other circuit elements that records value of a previous clock cycle. An output signal 308 of the logic system design 300 is denoted as $Y_k$, where k indicates a value of the output signal being a k-th bit of an output vector. $Y_k(t)$ denotes the value of k-th bit of the output vector, Y, at clock cycle t. Values of input signals and output signals of the logic system design 300 can be recorded during emulation or simulation. Here, the third bit of the output vector of a combinational cone to be diagnosed may be denoted as $Y_3=1000100$ in a temporal sequence. This gives output of the third bit with 7 clock cycles, namely, from oldest (right-most) to latest (left-most) output, $Y_3(t-3)=0$, $Y_3(t-2)=0$, $Y_3(t-1)=1$, $Y_3(t)=0, Y_3(t+1)=0, Y_3(t+2)=0, Y_3(t+3)=1$. Example values of the primary input signal $PI_1$ at clock cycles t−3 through t+3 are 0001101, example values of the register signal $X_1$ at clock cycles t−3 through t+3 are 0110011. An expected value of the output signal at clock cycle t is 1 based on the functionality and intended purpose of the logic system design 300, i.e., $Y_3^E(t)=1$, whereas an actual value of the output signal $Y_3$ at clock cycle t is 0 when executing the logic system design 300, indicating an error has occurred.

The disclosed method and apparatus are directed to performing circuit diagnosis and identifying a single-error root cause (e.g., sub-cone 302D) of the output error (e.g., error of the third bit at clock cycle t−3). The diagnosis of the logic system design can be performed based on machine learning models of the sub-cones and a backtracing principle.

In addition, failure of each output bit (i.e., $Y_k$) of the output vector may be traced and processes separately. There may be cases where the output vector has multiple bits with assertion failures at the current clock cycle. An assertion failure can indicate a value of a bit being different from the expected value. The disclosed error tracing process is designated for one bit of the output vector and can be performed multiple times based on the bit-length of the output (i.e., k ranges from 1 to bit length of the output vector). It is appreciated that separate bits of a same output vector can be traced in separate error tracing processes, respectively.

Returning to FIG. 2, at step S204, machine learning (ML) models of the plurality of sub-cones can be obtained. Each sub-cone has a corresponding ML model trained to predict a value of the output signal of the sub-cone according to values of the one or more input signals of the sub-cone.

Training and usage of the ML model of a sub-cone (also called a logic cone) does not require prior knowledge of internal structure of the logic cone. The internal structure of the logic cone may refer to logic gate(s) contained in the logic cone and connection relationship among logic gates when the logic cone includes multiple logic gates, such as a netlist of the logic cone. In other words, the logic cone can be considered as a black box. Training of the ML model is performed according to known values of input and output signals of the logic cone in recorded operations (also called waveform data) to obtain parameters (such as weights) in the ML model. For example, the waveform data may be obtained from a FSDB (Fast Signal Database) file. When the training is completed, the ML model can predict an output value based on current values of input signals of the logic cone. The trained machine learning model may also be referred to as the experience. In some embodiments, the ML model may also provide a confidence level of the predicted value. The confidence level may range from, for example, 50% to 100%.

In some embodiments, the ML model of a logic cone can be an artificial neural network (NN) model, such as a graph neural network (GNN) model. The NN model can include an activation function having a plurality of variables and a plurality of weights, each variable having a corresponding weight. The plurality of variables include at least the input signals of the circuit cone. In the training process, known values of input signals and corresponding correct output values are input into the NN model to determine the plurality of weights. After the training process is completed, the weights can be fixed.

In some embodiments, when using the trained ML model, current values of input signals are input into the ML model (e.g., the activation function with determined weights), so that the ML model can predict an output value corresponding to the current values of input signals. In some embodiments, the trained ML model includes a hypothesis function that predicts the output value corresponding to the values of input signals of a circuit cone, and the hypothesis function is denoted as $H_\theta(\ldots, x_j, \ldots)$. The trained machine learning model may also be referred to as the experience.

Figure 4:
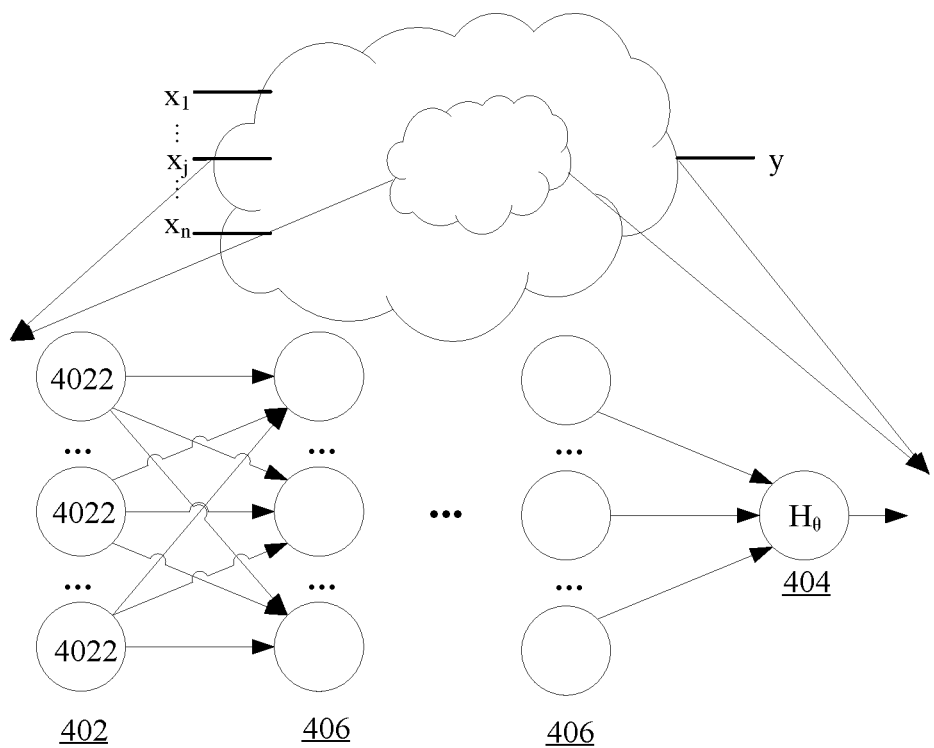
FIG. 4 is a schematic diagram illustrating an artificial neural network (NN) model of a logic cone according to some embodiments of the present disclosure.

FIG. 4 is a schematic diagram illustrating an artificial neural network (NN) model of a logic cone, according to embodiments of the disclosure. The logic cone may have one or more input signals and an output signal. The NN model may include an input layer 402 containing one or more input neurons 4022 and an output layer 404 containing an output neuron 4042. The input layer 402 may also be referred to as the first layer, and the output layer 404 may also be referred to as the n-th layer of the NN model, n being an integer greater than 1. The output signal of the logic cone corresponds to the output neuron 4042. Each input signal of the logic cone corresponds to one of the input neurons 4022. In some embodiments, the input neurons 4022 may further include a bias neuron. In some embodiments, the NN model of the logic cone may further include one or more hidden layers 406. A hidden layer may be the second to (n−1)-th layer of the NN model. The number of hidden layers and the number of neurons in each hidden layer may be determined according to different structures of the logic cone.

In addition, one or more neurons at i-th layer are connected to a neuron at (i+1)-th layer, i being an integer ranging from 1 to n−1. Each connection between a neuron at the ith layer and the neuron at the (i+1)-th layer corresponds to a weight. A value of the neuron at (i+1)-th layer may be calculated according to a linear combination of values of the one or more neurons at ith layer with the corresponding weights. The amplitude of the output neuron is controlled by an activation function. In some embodiments, the activation function can be a Sigmoid (Logistic) function denoted as g( ).

In a training process of an NN model of a logic cone, values of the input neurons 4022 and output neuron 406 are obtained from training samples to train weights corresponding to the connections in the NN model. After the training is completed, the weights corresponding to connections in the NN model are determined, and the NN model can predict an output value of the output neuron 406 according to values of the input neurons 4022, the structure of the NN model, and the weights.

Figure 5A:
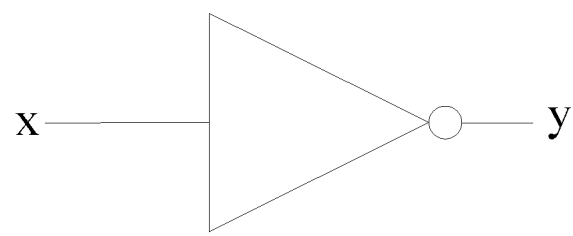
FIG. 5A is a schematic diagram illustrating an NN model of a one-input logic gate according to some embodiments of the present disclosure.
Figure 5A:
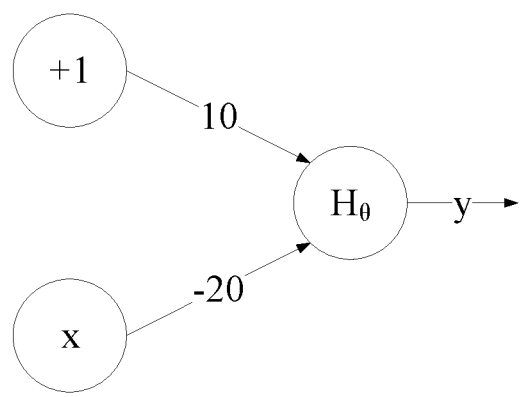

FIG. 5A is a schematic diagram illustrating a NN model of a one-input logic gate according to some embodiment of the disclosure. The input layer includes one input neuron denoted as x, and a bias neuron denoted as (+1). An example trained hypothesis function corresponding to the one-input gate can be:

$$H_\theta(x)=g((+1)\times 10+x\times(-20))$$

Here, example trained weight corresponding to x is −20, and example trained weight for the bias item is 10. Table 1 lists all possible input values and corresponding output values of the trained ML model of the one-input gate. The values listed in Table 1 are consistent with the truth table of a NOT gate.

TABLE 1

Input values and corresponding output values of a trained ML model of NOT gate

| x | $H_\theta(x)$ |
|---|---|
| 0 | g(10) ≈ 1 |
| 1 | g(−10) ≈ 0 |

Figure 5B:
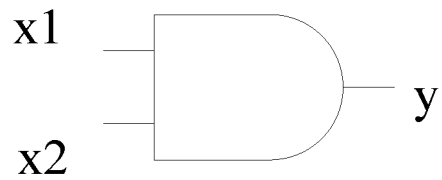
FIG. 5B is a schematic diagram illustrating an NN model of a two-input logic gate according to some embodiments of the present disclosure.
Figure 5B:
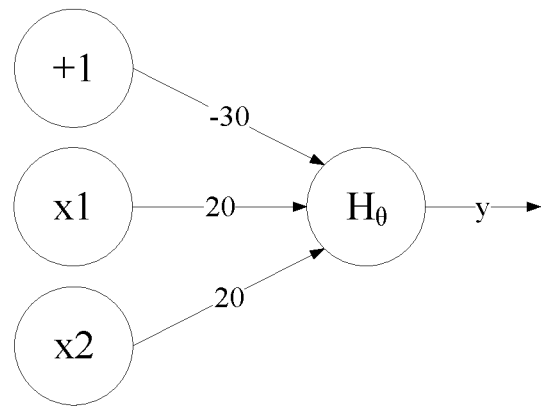

FIG. 5B is a schematic diagram illustrating a NN model of a two-input logic gate according to some embodiment of the disclosure. The input layer includes two input neurons denoted as x1 and x2 respectively, and a bias neuron denoted as (+1). An example trained hypothesis function corresponding to the two-input gate can be:

$$H_\theta(x1, x2)=g((+1)\times(-30)+x1\times 20+x2\times 20)$$

Here, example trained weights corresponding to x1 and x2 are 20 respectively, and example trained weight for the bias item is −30. Table 2 lists each combination of input values and corresponding output values of the trained ML model of the two-input gate. The values listed in Table 2 are consistent with the truth table of AND gate.

TABLE 2

Combinations of input values and output values of a trained ML model of AND gate

| x1 | x2 | $H_\theta(x1,x2)$ |
|---|---|---|
| 0 | 0 | g(−30) ≈ 0 |
| 0 | 1 | g(−10) ≈ 0 |
| 1 | 0 | g(−10) ≈ 0 |
| 1 | 1 | g(10) ≈ 1 |

Figure 5C:
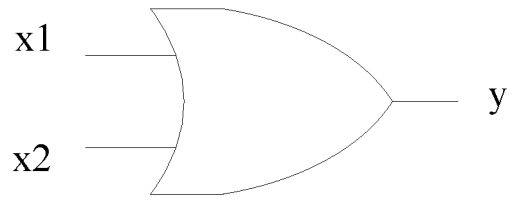
FIG. 5C is a schematic diagram illustrating an NN model of another two-input logic gate according to some embodiments of the present disclosure.
Figure 5C:
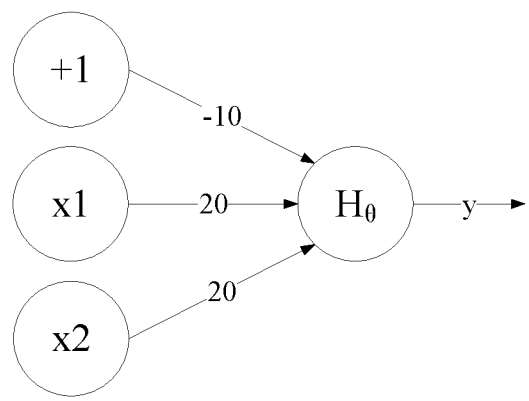

FIG. 5C is a schematic diagram illustrating a machine learning model of a two-input logic gate according to some embodiment of the disclosure. The input layer includes two input neurons denoted as x1 and x2, respectively, and a bias neuron denoted as (+1). An example trained hypothesis function corresponding to the two-input gate can be:

$$H_\theta(x1, x2)=g((+1)\times(-10)+x1\times 20+x2\times 20)$$

Here, example trained weights corresponding to x1 and x2 are 20, respectively, and example trained weight for the bias item is −10. Table 3 lists each combination of input values and corresponding output values of the trained ML model of the two-input gate. The values listed in Table 3 are consistent with the truth table of a OR gate.

TABLE 3

Combinations of input values and output values of a trained ML model of OR gate

| x1 | x2 | $H_\theta(x1,x2)$ |
|---|---|---|
| 0 | 0 | g(−10) ≈ 0 |
| 0 | 1 | g(10) ≈ 1 |
| 1 | 0 | g(10) ≈ 1 |
| 1 | 1 | g(30) ≈ 1 |

Figure 5D:
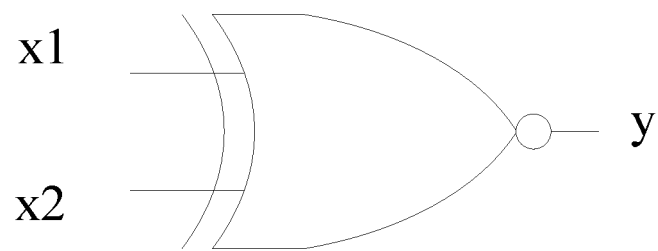
FIG. 5D is a schematic diagram illustrating an NN model of another two-input logic gate according to some embodiments of the present disclosure.
Figure 5D:
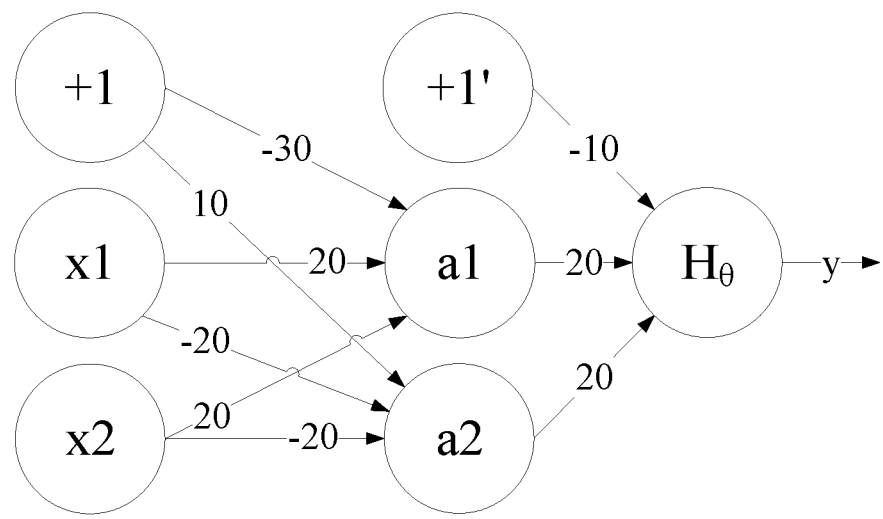

FIG. 5D is a schematic diagram illustrating a machine learning model of another two-input logic gate according to some embodiment of the disclosure. The input layer includes two input neurons denoted as x1 and x2, and a bias neuron denoted as (+1). The hidden layer includes two hidden neurons denoted as a1 and a2, and a hidden bias neuron denoted as (+1'). The hidden bias neuron does not have incoming connection. Example trained hypothesis functions corresponding to the two hidden neurons can be:

$$a1(x1, x2)=g((+1)\times(-30)+x1\times 20+x2\times 20); \text{ and}$$

$$a2(x1, x2)=g((+1)\times 10+x1\times(-20)+x2\times(-20))$$

Example trained hypothesis functions corresponding to the output neuron can be:

$$H_\theta(a1, a2)=g((+1)\times(-10)+a1\times 20+a2\times 20)$$

Table 4 lists each combination of input values and corresponding output values of the trained ML model of the two-input gate. The values listed in Table 4 are consistent with the truth table of an Exclusive-NOR (XNOR) gate.

TABLE 4

Combinations of input values and output values of a trained ML model of XNOR gate

| x1 | x2 | a1 | a2 | $H_\theta(x1,x2)$ |
|---|---|---|---|---|
| 0 | 0 | 0 | 1 | g(10) ≈ 1 |
| 0 | 1 | 0 | 0 | g(−10) ≈ 0 |
| 1 | 0 | 0 | 0 | g(−10) ≈ 0 |
| 1 | 1 | 1 | 0 | g(10) ≈ 1 |

It can be understood that the set of trained weights in any hypothesis function shown in above examples may not be the only set of weights. The hypothesis function may apply other sets of weights that generate the same outcome.

Besides examples shown in FIGS. 5A-5D, which are NN models of logic gates, NN models of logic cones at granularities other than the gate level can also be trained. The granularity of the ML model is quite flexible. For example, NN model of a gate can be trained, and NN model of a logic cone containing at least two or more connected logic gates (e.g., a 2-bit adder) can be trained. At the other end of the granularity spectrum, the whole circuitry of a combinational cone can be treated as a single ML model, the training could be more laborious. A common practice in setting the granularity somewhere in between based on the ML model coverage of a directed graph, similar to the technology mapping in logic synthesis. In some embodiments, training of a library cell (e.g., electronic logic functions such as AND, OR, INVERT, NAND, flip-flops, latches, and buffers) can be completed in advance independent of the logic system design.

In addition, the disclosed method does not require 100% accuracy of the trained model. In other words, the trained NN model of the logic cone may not always predict an expected outcome consistent with the designed functionality of the logic cone. The training of the NN model can be completed if the prediction accuracy is above an accuracy threshold (e.g., 90%). It can be understood that a higher accuracy threshold require more training data and/or longer training time.

Returning to FIG. 2, at step S206, backtracing can be performed on the plurality of sub-cones according to the output assertion failure, the machine learning models of the plurality of sub-cones, and dynamic backtracing sensitivities corresponding to the plurality of sub-cones, to obtain a backtracing result. A dynamic backtracing sensitivity (DBS) of a signal corresponding to a sub-cone indicates a likelihood that an erroneous value of the signal causes an erroneous output of the sub-cone on a sensitized path in the logic system design that leads the signal to the sub-cone.

Figure 6:
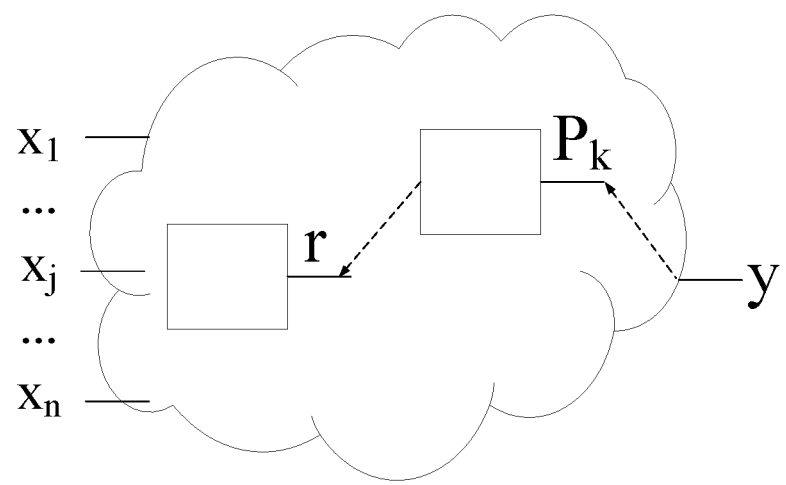
FIG. 6 is a schematic diagram illustrating a backtracing principle according to some embodiments of the present disclosure.

FIG. 6 is a schematic diagram illustrating a backtracing principle according to some embodiment of the disclosure. As shown in FIG. 6, signal r denotes a root cause of an error of a logic system design (e.g., cone 300), signal y denotes the output signal of the logic system design, and $p_k$ denotes a signal on a path from r to y. Boolean difference (BD) is used to describe the relationship between a root cause r and an output signal y as follows:

$$\frac{dy}{dr} = y(\ldots, r=0, \ldots) \oplus y(\ldots, r=1, \ldots)$$

Here, $$\frac{dy}{dr} = 1$$

indicates that an erroneous value of r is observable/detectable at y, and $\oplus$ indicates a logical XOR relationship. An axiom related to the BD representation is that a sensitized path exists from r to y. In other words, the error of signal r can be propagated through the path and cause the error of y.

BD follows a chain rule $$\frac{dy}{dr} = \frac{dy}{dp_k} \frac{dp_k}{dr}.$$

That is, an erroneous value of r is detectable at a signal $p_k$ on the sensitized path from r to y, and an erroneous value of $p_k$ is detectable at the signal y on the sensitized path.

In addition, basic formulas relating to BD are listed below, where $f$ and $g$ each denote a signal, $\bar{f}$ denotes a logical negation of signal $f$, denotes a logical AND relationship, and + denotes a logical OR relationship.

$$\frac{d\bar{f}}{dr} = \frac{df}{dr}$$

$$\frac{d(f \cdot g)}{dr} = \left(f \cdot \frac{dg}{dr}\right) \oplus \left(\frac{df}{dr} \cdot g\right) \oplus \left(\frac{df}{dr} \cdot \frac{dg}{dr}\right)$$

$$\frac{d(f+g)}{dr} = \left(\bar{f} \cdot \frac{dg}{dr}\right) \oplus \left(\frac{df}{dr} \cdot \bar{g}\right) \oplus \left(\frac{df}{dr} \cdot \frac{dg}{dr}\right)$$

$$\frac{d(f \oplus g)}{dr} = \frac{df}{dr} \oplus \frac{dg}{dr}$$

In an example embodiment, backtracing through a logic cone can be performed with one assumption: there is a single root cause that causes the error. Given values of one or more input signals and an output signal of the logic cone corresponding to a clock cycle that the erroneous output occurred, the probability that each input signal causes the erroneous output can be determined respectively. The probability that a target signal causes an erroneous value of an output signal of a logic cone is referred to as Dynamic Backtrace Sensitivity (DBS) of the target signal corresponding to the logic cone, or as DBS of the target signal corresponding to the output signal. It can be understood that the target signal is an up-stream signal of the output signal. For example, a target signal of a logic cone having a DBS indicates that the error of the output signal of the logic cone is as likely caused by the target signal as its DBS. The backtracing can continue to another logic cone that outputs the target signal accordingly.

In an example embodiment, DBS indicates the probability of the root cause by the Bayes' law, and complies with the conservation law. For example, a sum of DBS of all input signals corresponding to the same logic cone can be 100% if the neural network models are 100% accurate.

In some embodiments, the DBS of an input signal can be determined by a neural network model trained for a particular logic cone.

Figure 7A:
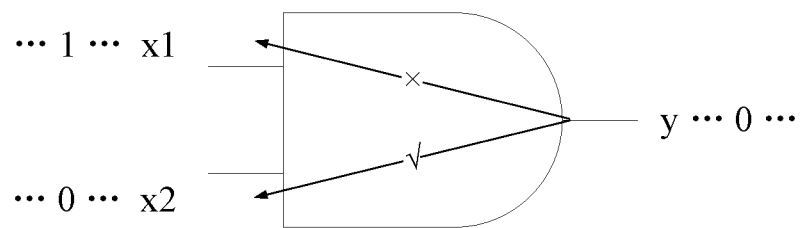
FIG. 7A is a schematic diagram illustrating a backtracing scenario of a logic gate according to some embodiments of the present disclosure.

Backtracing examples are described herein based on the BD representation. FIG. 7A is a schematic diagram illustrating a backtracing scenario of a logic gate according to some embodiment of the disclosure. As shown in FIG. 7A, the logic AND gate has two input signals x1 and x2, and an output signal y. During an actual operation, values of the two input signals are respectively 1 and 0 at a clock cycle, an expected value of the output signal is 1, and an erroneous value of the output signal is 0. In other words, an assertion "y==1" fails at the clock cycle. The BD representation of the error at the AND gate can be described as:

$$\frac{dy}{dr} = x2 \cdot \frac{dx1}{dr} \oplus \frac{dx2}{dr} \cdot x1 \oplus \frac{dx1}{dr} \cdot \frac{dx2}{dr} = 1 \cdot \frac{dx2}{dr} = \frac{dx2}{dr}$$

In this example, the probability of an incorrect value of x1 resulting in the incorrect value of y (i.e., DBS of x1 corresponding to y) is about 0, i.e., DBS(x1)=0%. Because the value of x2 at the clock cycle is 0, the expected output is 0 regardless of the value of x1. That is, an error of x1 is not detectable at y. Accordingly, the backtracing process does not continue through x1. The probability of an incorrect value of x2 resulting in the incorrect value of y (i.e., DBS of x2 corresponding to y) is about 100%, i.e., DBS(x2)=100%. Accordingly, the backtracing process continues through x2 to trace an upstream logic cone until reaching the root cause.

Figure 7B:
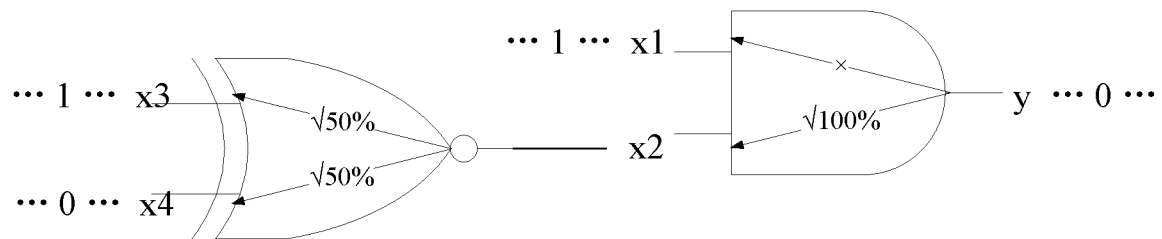
FIG. 7B is a schematic diagram illustrating a backtracing scenario of two connected logic gates according to some embodiments of the present disclosure.

FIG. 7B is a schematic diagram illustrating a backtracing scenario of two connected logic gates according to some embodiment of the disclosure. The circuit component shown in FIG. 7B includes the AND gate shown in FIG. 7A and an upstream XNOR gate corresponding to signal x2. As determined previously, the backtracing process does not trace an upstream cone corresponding to signal x1 because the corresponding DBS is about 0%, and traces the upstream cone corresponding to signal x2, i.e., the XNOR gate. Values of the input signals of the XNOR gate are respectively x3=1 and x4=0 at a clock cycle, the value of the output signal is x2=0. The BD representation of the error and the root cause can be described as:

$$\frac{dy}{dr} = \frac{dx2}{dr} = \frac{dx3}{dr} \oplus \frac{dx4}{dr}$$

In this example, the probability of an incorrect value of x3 resulting in the value of x2 (i.e., DBS of x3 corresponding to x2) is about 50%, i.e., DBS(x3)=50%. Similarly, it can be determined that DBS(x4)=50%. The backtracing may continue to evaluate upstream signals of x3 and x4, respectively.

From the examples shown in FIG. 7A and FIG. 7B, it can be understood that DBS measures a likelihood of an erroneous signal (e.g., y in the diagrams) caused by an upstream signal (e.g., x1, x2, x3 or x4 in the diagrams).

It should be noted that, although circuit gate types are shown in FIG. 7A and FIG. 7B for explanation purposes, the process of determining the DBS of a signal corresponding to a logic cone in an example embodiment does not need to identify specific gate types and does not need to know the BD representation. The DBS of a target signal corresponding to a logic cone is determined according to the trained ML model of the logic cone and the values of input signals and output signal of the logic cone. The trained ML model can include a value table listing all combinations of input values and output values corresponding to each combination of input values. For example, DBS(x1) and DBS(x2) can be determined according to values of input signals x1 and x2 corresponding to the clock cycle (e.g., x1=1 and x2=0), an actual value of output signal y corresponding to the clock cycle (e.g., y=0), and the combinations of input values and output values of the gate as shown in Table 2. DBS(x3) and DBS(x4) can be determined according to values of input signals corresponding to the clock cycle (e.g., x3=1 and x4=0), an actual value of output signal (e.g., x2=0), and the combinations of input values and output values of the gate as shown in Table 4.

Figure 8:
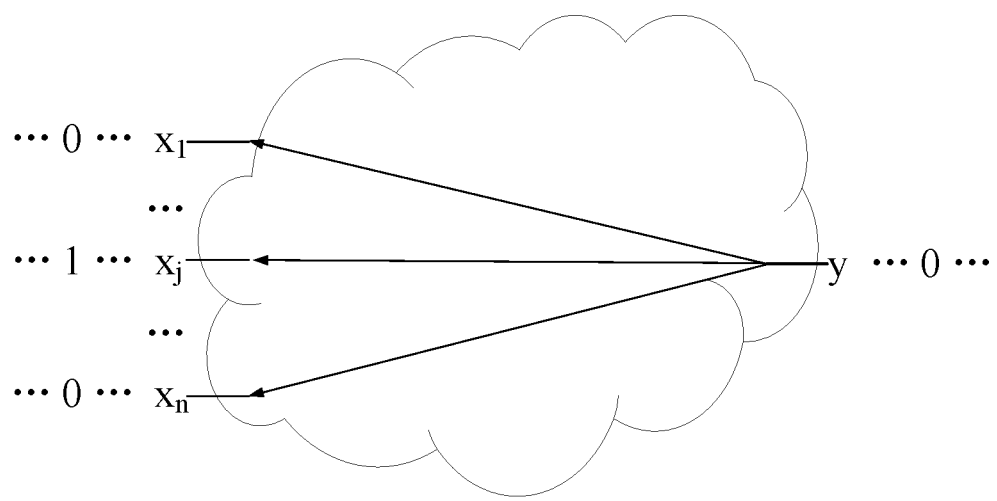
FIG. 8 is a schematic diagram illustrating a generalized backtracing scenario of a combinational cone according to some embodiments of the present disclosure.

FIG. 8 is a schematic diagram illustrating a generalized backtracing scenario of a combinational cone according to some embodiment of the disclosure. As shown in FIG. 8, the combinational cone has a plurality of input signals $(x_1, \ldots, x_j, \ldots, x_n)$ and an output signal y. At a clock cycle t, each input signal has a corresponding value, e.g., $(x_1=0, \ldots, x_j=1, \ldots, x_n=0)$, and the output signal has an erroneous value, e.g., y=0. In other words, according to the design purpose or designed functionality of the combinational cone, the output signal is expected to have value 1, not the error value 0. Accordingly, it can be described as an assertion y(t)==1 fails at clock cycle t.

The backtracing process through the combinational cone can include looping through x1 and backtracing with the respective probabilities (i.e., DBS) under the current scenario ($x_1=0, \ldots, x_1=1, \ldots, x_n=0$) based on the experience (i.e., trained machine learning model). Further, the backtracing process through the combinational cone can be performed on the assumption that there is a single root cause that produces the erroneous value of y.

Returning to the example shown in FIG. 3, combining the backtracing principle shown in FIG. 6 and the ML model described above, each sub-cone has a corresponding trained ML model and backtracing of an output error of the signal $Y_k$ at a clock cycle t in FIG. 3 may start from sub-cone 302F whose output signal is the output signal y of the combinational cone 300 in FIG. 6. Values of input signals of sub-cone 302F corresponding to clock cycle t are input to the trained ML model corresponding to sub-cone 302F to predict a value of the output signal. When the predicted value is consistent with the actual output value of the signal y at clock cycle t, it can be assumed that the functionality of sub-cone 302F is normal and backtracing can be performed to locate an upstream signal $p_1$ on the path from root cause r to the output signal y. During this backtracing, the input signals of the sub-cone 302F are evaluated one by one to determine their respective DBS corresponding to the output signal y. In some embodiments, all input signals having a DBS higher than a given threshold can be pushed into the AF Priority Queue, which can automatically order the queued input signals in priorities. Accordingly, signal Pt having the highest DBS among all input signals of the sub-cone 302F may be determined and analyzed first. Signal $p_1$ may be the output signal of sub-cone 302E. The backtracing then moves on to evaluate sub-cone 302E. When a predicted value using the trained ML model of sub-cone 302E according to values of input signals of sub-cone 302E is consistent with the value of signal Pt, the input signals of the sub-cone 302E are evaluated one by one to determine their respective DBS corresponding to signal $p_1$. Signal $p_2$ having the highest DBS among all input signals of the sub-cone 302E may be determined and analyzed with priority. Signal $p_2$ may be the output signal of sub-cone 302D. When a predicted value using the trained ML model of sub-cone 302D according to values of input signals of sub-cone 302D is not consistent with the value of signal $p_2$, it may be determined that the error is occurred at sub-cone 302D, i.e., a candidate root cause r is signal $p_2$ produced by sub-cone 302D. Sub-cone 302D may be added to a backtracing result.

With reference back to FIG. 2, at step S208, the backtracing process may produce a backtracing result including one or more target sub-cones identified as candidate root causes of the output assertion failure. In some embodiments, each target sub-cone corresponds to a malfunction probability. A higher malfunction probability indicates a greater chance that the root cause occurred in the corresponding target sub-cone.

Figure 9A:
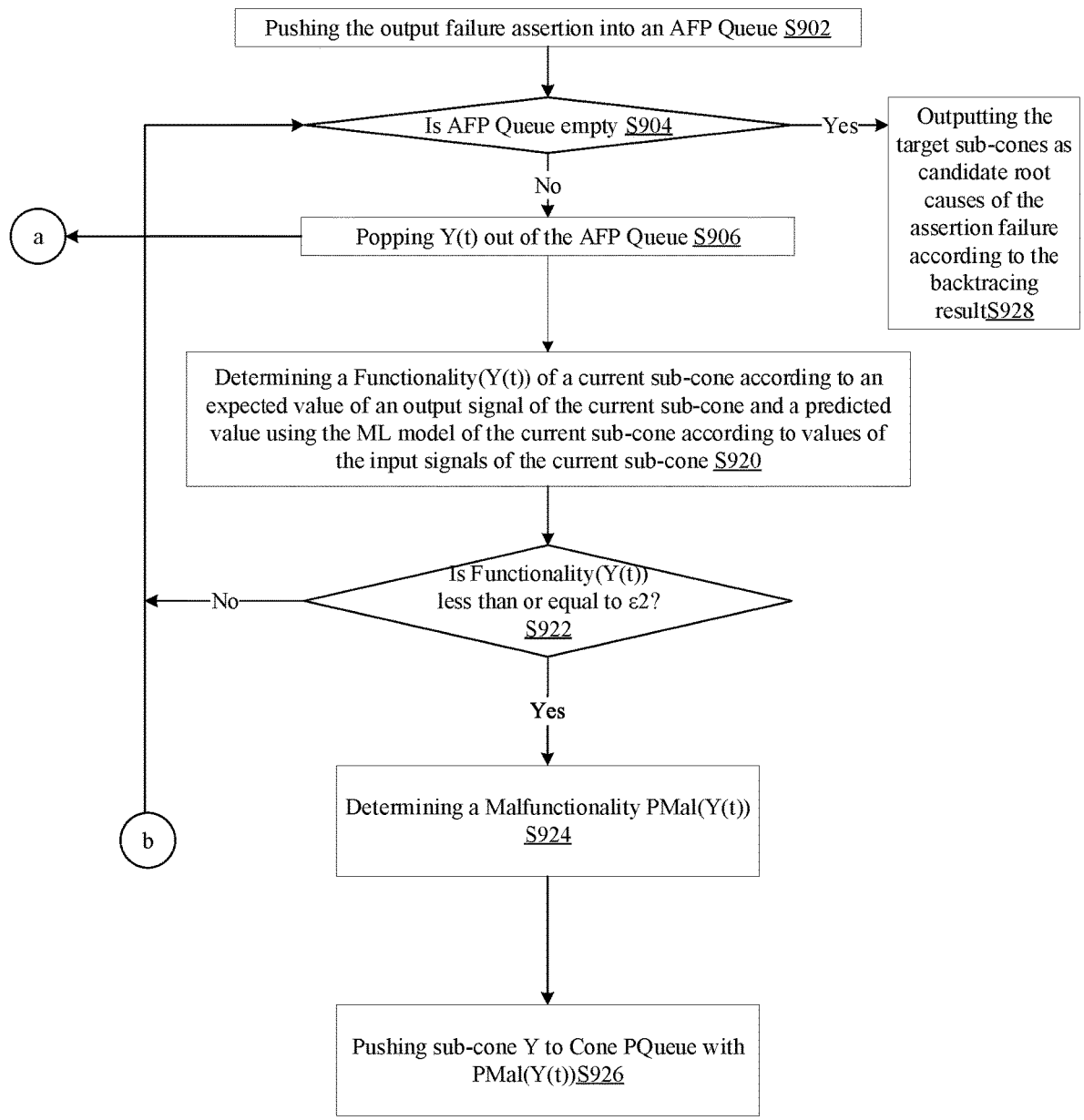
FIG. 9A and FIG. 9B illustrate a flow chart of a backtracing process according to some embodiments of the present disclosure.
Figure 9B:
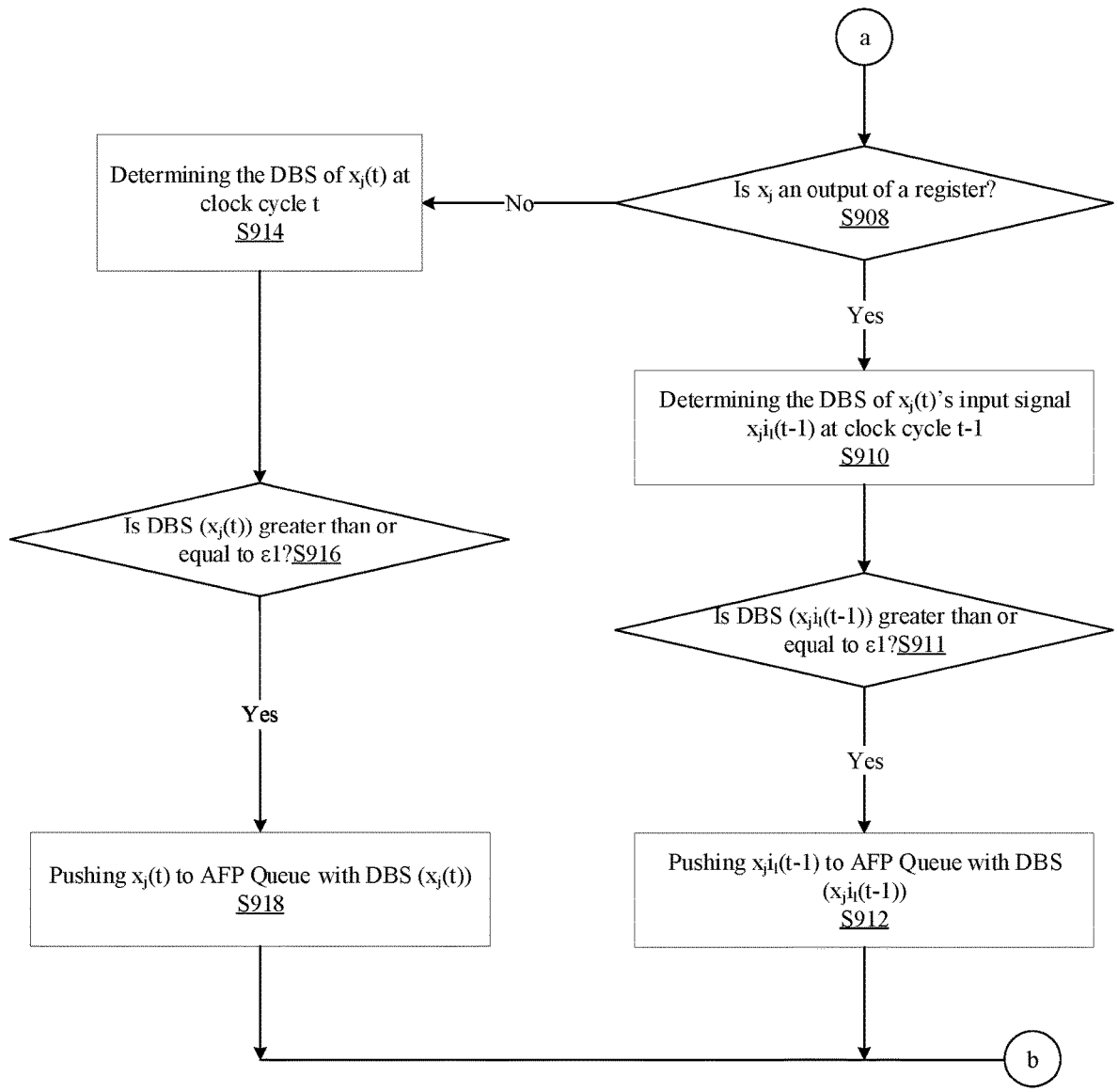

FIG. 9A and FIG. 9B illustrate a schematic flow chart of a backtracing process 900 according to some embodiment of the disclosure. Backtracing process 900 can be performed by, for example, computing system 100 of FIG. 1. And process 900 can include steps as follows.

At step S902, computing system 100 can start the backtracing process by pushing the output assertion failure into an Assertion Failure (AF) Priority Queue when an assertion (e.g., "Y(t)==1") fails at a clock cycle t.

It is appreciated that before step S902, computing system 100 can obtain an assertion failure of a combinational cone (e.g., 300 of FIG. 3) of a logic system design. The combinational cone can include a plurality of sub-cones (e.g., 302A-302F of FIG. 3). Each sub-cone can represent a sub-circuitry of the logic design system and have one or more input signals and an output signal. For example, as shown in FIG. 4, the logic cone of FIG. 4 has input signals $x_1$ through $x_n$ and an output signal y.

An assertion failure can indicate an actual signal value of the combinational cone at a current clock cycle being different from an expected signal value at the current clock cycle. The expected signal can be set by a user, e.g., in an assertion.

The assertion failure can be the output assertion failure of step S902, when an output signal of a cone is asserted. It is appreciated that the assertion failure can also be an input assertion failure when an input signal of a cone is asserted.

The assertion failure can be included in an AF Priority Queue having one or more assertion failures. The AF Priority Queue can be maintained in the backtracing process. Each assertion failure identifies one of the sub-cones and an expected output value of the identified sub-cone. The assertion failure is also associated with a clock cycle corresponding to the failure. The sub-cone identifier indicates the sub-cone whose value of output signal at the clock cycle does not equal the expected value. Because each sub-cone corresponds to a Machine Learning model, the sub-cone identifier is also considered as an ML model identifier, and may be denoted as θ. The total number of sub-cones included in the combinational cone may be denoted as SQ (Sub-cone Quantity). Accordingly, θ can range from 1 to SQ. The expected value is either 0 or 1. The clock cycle may be t. A clock cycle of "t−1" indicates a clock cycle that is one cycle before the clock cycle of "t".

Each assertion failure has a corresponding priority. The priority of one assertion failure is evaluated by a probability that the failure is related to the current sub-cone, and can range from 0 to 100%. In an example embodiment, the priority of the assertion failure of an upstream sub-cone is determined according to the DBS of an input signal of a downstream sub-cone, the input signal of the downstream sub-cone being the output signal of the upstream sub-cone. It is appreciated that an assertion failure being pushed into the AF Priority Queue as the first assertion failure in the queue is an output assertion failure.

The sub-cone identifier corresponding to output assertion failure is the identifier of the last sub-cone in the combinational cone, i.e., SQ. The corresponding priority of the output assertion failure may be set as 100%.

In some embodiments, an output signal, which can be one bit of an output vector, may include multiple values different from the corresponding expected values at multiple clock cycles. For example, $Y_3$ is 1000$\underline{1}$00, but expected value $Y_3^E$ is 10000$\underline{1}$0. In this case, two bits of the actual output vector are different from the expected values. That is, two assertion failures can be generated. The two assertion failures are analyzed and diagnosed separately and independently, although the diagnosis on the earlier assertion failure in temporal domain tends to narrow down the root cause faster.

At step S904, computing system 100 can determine whether the AF Priority Queue is empty (S904).

At step S906, if the AF Priority Queue is not empty (S904: No), an assertion failure Y(t) is popped out of the AF Priority Queue for evaluation. The assertion failure Y(t) corresponds to an output signal Y of a current sub-cone at the current clock cycle t. In some embodiments, the assertion failure with a highest priority is popped out at the beginning of each iteration. In some embodiments, if the AF Priority Queue includes multiple assertion failures with same highest priority value and different sub-cone identifiers, the assertion failure corresponding to the less upstream sub-cone (i.e., a sub-cone closer to the output) is popped first. If the different sub-cone identifiers indicate sub-cones at the same level, the assertion failures can be popped out randomly.

At first, the AF Priority Queue may only include an assertion corresponding to the last sub-cone of the logic system design. As the propagation happens, other assertions related to other sub-cones may be pushed in and popped out, implementing the backtracing.

By evaluating each assertion failure in AF Priority Queue starting from the end of the logic system design, the algorithm propagates backwards in the combinational cone to find the root cause of the output error based on probabilities evaluated by ML models. The assertion failure(s) recorded in the AF Priority Queue keeps the wave front (i.e., sensitized sub-cones to be analyzed) of such propagation until the wave front meets the root cause of the error.

Evaluating an assertion failure of a current sub-cone can generally leads to two kinds of possible root causes, that is, an erroneous sub-cone or an erroneous input signal causing an output failure of the current sub-cone.

Steps S908-S918 of process 900 are directed to exploring the possible erroneous input signal and steps S920-S926 of process 900 are directed to exploring the possible erroneous sub-cone.

To explore the possible input signal causing an output failure of an output signal of a current sub-cone, the backtracing process can traverse through all input signals associated with the output signal. In FIG. 9A and FIG. 9B, an associated input signal is denoted as $x_j$.

At step S908, computing system 100 can determine whether an associated input signal of the current sub-cone at the current clock cycle t is an output of a register.

In this context, a register can refer to a circuit that outputs a signal in response to an input received at one clock cycle earlier. If the associated input signal $x_j$ is an output of a register, it indicates that a register input of the register at an earlier clock cycle can be causing the output assertion failure. Thus, rather than evaluating the associated input signal, which is an output of a register, computing system 100 can go upwards to evaluate the register input of the register.

Accordingly, at step S910, in response to the associated input signal $x_j$ being the output of the register, computing system 100 can determine a first DBS of a register input ($x_j i_1(t-1)$ of FIG. 9B) of the register at a first clock cycle (t−1) that is one cycle before the current clock cycle t. As discussed above, a DBS of an input of a sub-cone indicates a likelihood that an erroneous value of the signal causes an erroneous output of the sub-cone on a sensitized path in the logic system design. In some embodiments, the DBS of the signal (e.g., the associated input signal) can be determined by the ML model (e.g., the NN model of FIG. 4) corresponding to the sub-cone.

Then, at step S911, computing system 100 can determine whether the first DBS is greater than or equal to a first threshold (e.g., ε1 in FIG. 9B). And in response to the first DBS being greater than or equal to the first threshold, computing system 100, at step S912, can push the register input ($x_j i_1(t-1)$ of FIG. 9B) to the AF Priority Queue with the first DBS. It is appreciated that, if the first DBS is less than the first threshold, the register input (i.e., $x_j i_1(t-1)$) is unlikely to be the root cause of the output assertion failure and computing system 100 can evaluate another register input, or when all register inputs corresponding to the associated input signal $x_j$ are processed, return to step S908.

On the other hand, if the associated input signal is not the output of the register, computing system 100 can, at step S914, determine a second DBS of the associated input signal $x_j$ at the current clock cycle t. Similarly, computing system 100 can determine whether the second DBS is greater than or equal to the first threshold (e.g., ε1 in FIG. 9B) at step S916. Similarly, if the second DBS is less than the first threshold, the associated input signal $x_j$ is unlikely to be the root cause of the output assertion failure and computing system 100 can evaluate another input signal (i.e., return to step S908), or when all associated input signals are processed, return to step S904.

At step S918, computing system 100 can push the associated input signal at the current clock cycle to the AF Priority Queue along with the DBS.

It can be seen from above, by tracing the output assertion failure upstream, erroneous input signals can be identified and pushed to the AF Priority Queue for additional evaluation.

In some embodiments, the current sub-cone having the associated input signal may be a reconvergence sink. Here, a sub-cone with an output signal having two or more branches that merge into a single sub-cone in the logic system design is referred to as a reconvergence source, and the single sub-cone in the logic system design is referred to as the reconvergence sink. In some embodiments, computing system 100 can obtain a directed graph representing connection relationships of the sub-cones of the logic system design, and determine whether the current sub-cone is a reconvergence sink according to the directed graph.

When the current sub-cone is determined as a reconvergence sink, an additional pseudo sub-cone is analyzed (steps S908-S926). The current sub-cone is extended to a pseudo sub-cone, and the inputs of the pseudo sub-cone are updated with the reconvergence sources. In other words, signals at the reconvergence sources are considered as the input signals of the pseudo sub-cone and are evaluated respectively to determine a possible erroneous signal. In some embodiments, when the current sub-cone is not a reconvergence sink and steps S908-S926 are completed for the current sub-cone, computing system 100 can return to step S904 to continue backtracing process.

While backtracing process 900 working to identify possible erroneous input signals, backtracing process 900 can also determine if the error is derived from an erroneous sub-cone.

At step S920, computing system 100 can predict a value of the output signal according to actual values of the one or more input signals of the current sub-cone at the current clock cycle, using the ML model of the current sub-cone, and determine a normal-operation probability (i.e., the Functionality Y(t) in FIG. 9A) of the current sub-cone according to an expected value of the output signal of the current sub-cone at the current clock cycle and the predicted value at the current clock cycle. The expected value can be the asserted value in the assertion failure.

In some embodiments, the normal-operation probability of the current sub-cone is determined by the ML model of the current sub-cone. The ML model of the sub-cone can be trained according to training data of the sub-cone. The training data is recorded from a plurality of successful operations of the sub-cone. The training data of the sub-cone includes input values of the one or more input signals of the sub-cone and corresponding output values of the output signal of the sub-cone.

Then, computing system 100 can determine whether the current sub-cone is malfunctioning according to the normal-operation probability Y(t).

More specifically, at step S922, computing system 100 can determine whether the normal-operation probability Y(t) is less than or equal to a second threshold (e.g., ε2). If normal-operation probability Y(t) is less than or equal to ε2, it indicates that it is very likely the root cause of the assertion failure is the design of the sub-cone. That is, the current sub-cone is malfunctioning.

Thus, in response to the current sub-cone is malfunctioning, computing system 100 can determine a mal-functionality PMal(Y(t)) using the below equation at step S924.

$$PMal(Y(t))=(1-P(Y(t))) \cdot DBS(Y(t))$$

As discussed above, both P(Y(t)) and DBS(Y(t)) can be determined by a trained neural network (i.e., ML model) corresponding to the specific sub-cone.

At step S926, computing system 100 can push the sub-cone into a Cone Priority Queue with PMal(Y(t)). The Cone Priority Queue can be used to store possible erroneous sub-cones, and the sub-cones in the Cone Priority Queue can be further analyzed to determine the root cause of the assertion failure. PMal(Y(t)) may indicate a likelihood that the corresponding sub-cone is erroneous.

Reference back to step S904, if the AF Priority Queue is empty, backtracing process 900 can go to step S928. At step S928, in response to the AF Priority Queue being empty, computing system 100 can output the one or more target sub-cones as candidate root causes of the assertion failure according to the backtracing result.

Various embodiments of the present disclosure provide a method and apparatus for identifying a root cause of an error in a logic system design based on a directed graph and trained machine learning models of nodes in the directed graph, without running a circuit simulation or formal verification. The diagnosis process is automatic and is greatly simplified compared to existing debugging mechanisms. Instead of using traditional error diagnosis technologies on hundreds or thousands of possible causes, the Cone Priority Queue can effectively reduce the human effort and provide just a few number of candidates with their priorities.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of example systems, devices, and units may be omitted and references can be made to the descriptions of the example methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A method for tracing an error of a logic system design, comprising:
    obtaining an assertion failure of a combinational cone of the logic system design, the combinational cone comprising a plurality of sub-cones, each sub-cone representing a sub-circuitry of the logic system design and having one or more input signals and an output signal, and the assertion failure indicating an actual signal value of the combinational cone at a current clock cycle being different from an expected signal value at the current clock cycle;
    obtaining machine learning (ML) models of the plurality of sub-cones, each sub-cone having a corresponding ML model trained to predict a value of the output signal of the sub-cone according to values of the one or more input signals of the sub-cone;
    performing backtracing on the plurality of sub-cones according to the assertion failure, the machine learning models of the plurality of sub-cones, and dynamic backtracing sensitivities (DBS) corresponding to the plurality of sub-cones, to obtain a backtracing result; and
    outputting one or more target sub-cones as candidate root causes of the assertion failure according to the backtracing result,
    wherein the assertion failure is included in an assertion failure (AF) Priority Queue having one or more assertion failures, and performing the backtracing on the plurality of sub-cones further comprises:
        popping the assertion failure out of the AF Priority Queue in response to the AF Priority Queue being not empty, the assertion failure corresponding to an output signal of a current sub-cone at the current clock cycle;
        predicting, using the ML model of the current sub-cone, a value of the output signal according to actual values of the one or more input signals of the current sub-cone at the current clock cycle;
        determining a normal-operation probability of the current sub-cone according to an expected value of the output signal of the current sub-cone at the current clock cycle and the predicted value at the current clock cycle;
        determining whether the current sub-cone is malfunctioning according to the normal-operation probability; and
        in response to the current sub-cone being malfunctioning, pushing the current sub-cone to a Cone Priority Queue.

2. The method according to claim 1, wherein performing the backtracing on the plurality of sub-cones further comprises: determining whether one or more associated input signals of the current sub-cone is erroneous, and determining whether the one or more associated input signals of the current sub-cone is erroneous further comprises:
    determining whether an associated input signal of the current sub-cone at the current clock cycle is an output of a register;
    in response to the associated input signal being the output of the register, determining a first dynamic backtracing sensitivity (DBS) of a register input of the register at a first clock cycle that is one cycle before the current clock cycle, wherein a DB S of a signal of a sub-cone indicates a likelihood that an erroneous value of the signal causes an erroneous output of the sub-cone on a sensitized path in the logic system design, and the DBS of the signal is determined by the ML model corresponding to the sub-cone;
    determining whether the first DBS is greater than or equal to a first threshold; and
    in response to the first DBS being greater than or equal to the first threshold, pushing the register input at the first clock cycle of the register to the AF Priority Queue along with the first DBS as an assertion failure.

3. The method according to claim 2, wherein determining whether the one or more associated input signals of the current sub-cone is erroneous further comprises:
    in response to the associated input signal being not the output of a register, determining a second DBS of the associated input signal;
    determining whether the second DBS is greater than or equal to the first threshold; and
    in response to the second DBS being greater than or equal to the first threshold, pushing the associated input signal at the current clock cycle to the AF Priority Queue along with the second DBS as an assertion failure.

4. The method according to claim 3, wherein determining whether the current sub-cone is a reconvergence sink comprises:
    obtaining a directed graph representing connection relationships of the sub-cones of the logic system design; and
    determining whether the current sub-cone is a reconvergence sink according to the directed graph.

5. The method according to claim 2, further comprising:
    determining whether the current sub-cone having the associated input signal is a reconvergence sink, wherein a sub-cone with an output signal having two or more branches that merge into a single sub-cone in the logic system design is referred to as a reconvergence source, and the single sub-cone in the logic system design is referred to as the reconvergence sink;
    in response to determining that the current sub-cone is the reconvergence sink, extending the current sub-cone to a pseudo sub-cone, and updating the inputs of the pseudo sub-cone with the reconvergence sources and returning to perform backtracing through the reconvergence sources; and
    in response to determining that the current sub-cone is not the reconvergence sink, popping another assertion failure with a highest priority out of the AF Priority Queue if the AF Priority Queue is not empty.

6. The method according to claim 1, further comprising:
obtaining training data recorded from a plurality of successful operations of the plurality of sub-cones, the training data of a sub-cone including input values of the one or more input signals of the sub-cone and corresponding output values of the output signal of the sub-cone; and
training the ML model of the sub-cone according to the training data of the sub-cone.

7. The method according to claim 1, wherein:
the normal-operation probability of the current sub-cone is determined by the ML model of the current sub-cone.

8. The method according to claim 1, further comprising:
in response to the AF Priority Queue being empty, outputting the one or more target sub-cones in the Cone Priority Queue as candidate root causes of the assertion failure according to the backtracing result.

9. A computing system for tracing an error of a logic system design, comprising:
a memory, storing a set of instructions; and
at least one processor coupled to the memory and configured to:
obtain an assertion failure of a combinational cone of the logic system design, the combinational cone comprising a plurality of sub-cones, each sub-cone representing a sub-circuitry of the logic system design and having one or more input signals and an output signal, and the assertion failure indicating an actual signal value of the combinational cone at a current clock cycle being different from an expected signal value at the current clock cycle;
obtain machine learning (ML) models of the plurality of sub-cones, each sub-cone having a corresponding ML model trained to predict a value of the output signal of the sub-cone according to values of the one or more input signals of the sub-cone;
perform backtracing on the plurality of sub-cones according to the assertion failure, the machine learning models of the plurality of sub-cones, and dynamic backtracing sensitivities (DBS) corresponding to the plurality of sub-cones, to obtain a backtracing result; and
output one or more target sub-cones as candidate root causes of the assertion failure according to the backtracing result,
wherein the assertion failure is included in an assertion failure (AF) Priority Queue having one or more assertion failures, and the backtracing performed on the plurality of sub-cones according to the assertion failure further comprises:
popping the assertion failure out of the AF Priority Queue in response to the AF Priority Queue being not empty, the assertion failure corresponding to an output signal of a current sub-cone at the current clock cycle;
predicting, using the ML model of the current sub-cone, a value of the output signal according to actual values of the one or more input signals of the current sub-cone at the current clock cycle;
determining a normal-operation probability of the current sub-cone according to an expected value of the output signal of the current sub-cone at the current clock cycle and the predicted value at the current clock cycle;
determining whether the current sub-cone is malfunctioning according to the normal-operation probability; and
in response to the current sub-cone being malfunctioning, pushing the current sub-cone to a Cone Priority Queue.

10. The system according to claim 9, wherein the backtracing performed on the plurality of sub-cones according to the assertion failure further comprises: determining whether one or more associated input signals of the current sub-cone is erroneous, and determining whether the one or more associated input signals of the current sub-cone is erroneous further comprises:
determining whether an associated input signal of the current sub-cone at the current clock cycle is an output of a register;
in response to the associated input signal being the output of the register, determining a first dynamic backtracing sensitivity (DBS) of a register input of the register at a first clock cycle that is one cycle before the current clock cycle, wherein a DB S of a signal of a sub-cone indicates a likelihood that an erroneous value of the signal causes an erroneous output of the sub-cone on a sensitized path in the logic system design, and the DBS of the signal is determined by the ML model corresponding to the sub-cone;
determining whether the first DBS is greater than or equal to a first threshold; and
in response to the first DBS being greater than or equal to the first threshold, pushing the register input at the first clock cycle of the register to the AF Priority Queue along with the first DBS as an assertion failure.

11. The system according to claim 10, wherein determining whether the one or more associated input signals of the current sub-cone is erroneous further comprises:
in response to the associated input signal being not the output of a register, determining a second DBS of the associated input signal;
determining whether the second DBS is greater than or equal to the first threshold; and
in response to the second DBS being greater than or equal to the first threshold, pushing the associated input signal at the current clock cycle to the AF Priority Queue along with the second DBS as an assertion failure.

12. The system according to claim 11, wherein the at least one processor is further configured to:
obtain a directed graph representing connection relationships of the sub-cones of the logic system design; and
determine whether the current sub-cone is a reconvergence sink according to the directed graph.

13. The system according to claim 10, wherein the at least one processor is further configured to:
determine whether the current sub-cone having the associated input signal is a reconvergence sink, wherein a sub-cone with an output signal having two or more branches that merge into a single sub-cone in the logic system design is referred to as a reconvergence source, and the single sub-cone in the logic system design is referred to as the reconvergence sink;
in response to determining that the current sub-cone is a reconvergence sink, extend the current sub-cone to a pseudo sub-cone, and updating the inputs of the pseudo sub-cone with the reconvergence sources and returning to perform backtracing through these reconvergence sources;
in response to determining that the current sub-cone is not a reconvergence sink, pop another assertion failure with a highest priority out of the AF Priority Queue if the AF Priority Queue is not empty.

14. The system according to claim 9, wherein the at least one processor is further configured to:
  obtain training data recorded from a plurality of successful operations of the plurality of sub-cones, the training data of a sub-cone including input values of the one or more input signals of the sub-cone and corresponding output values of the output signal of the sub-cone; and
  train the ML model of the sub-cone according to the training data of the sub-cone.

15. The system according to claim 9, wherein:
  the normal-operation probability of the current sub-cone is determined by the ML model of the current sub-cone.

16. The system according to claim 9, wherein the at least one processor is further configured to:
  in response to the AF Priority Queue being empty, output the one or more target sub-cones in the Cone Priority Queue as candidate root causes of the assertion failure according to the backtracing result.

17. A non-transitory computer readable storage medium, storing computer instructions that, when executed by at least one processor, cause the at least one processor to perform:
  obtaining an assertion failure of a combinational cone of the logic system design, the combinational cone comprising a plurality of sub-cones, each sub-cone representing a sub-circuitry of the logic system design and having one or more input signals and an output signal, and the assertion failure indicating an actual signal value of the combinational cone at a current clock cycle being different from an expected signal value at the current clock cycle;
  obtaining machine learning (ML) models of the plurality of sub-cones, each sub-cone having a corresponding ML model trained to predict a value of the output signal of the sub-cone according to values of the one or more input signals of the sub-cone;
  performing backtracing on the plurality of sub-cones according to the assertion failure, the machine learning models of the plurality of sub-cones, and dynamic backtracing sensitivities (DBS) corresponding to the plurality of sub-cones, to obtain a backtracing result; and
  outputting one or more target sub-cones as candidate root causes of the assertion failure according to the backtracing result,
  wherein the assertion failure is included in an assertion failure (AF) Priority Queue having one or more assertion failures, and performing the backtracing on the plurality of sub-cones according to the assertion failure further comprises:
    popping the assertion failure out of the AF Priority Queue in response to the AF Priority Queue being not empty, the assertion failure corresponding to an output signal of a current sub-cone at the current clock cycle;
    predicting, using the ML model of the current sub-cone, a value of the output signal according to actual values of the one or more input signals of the current sub-cone at the current clock cycle;
    determining a normal-operation probability of the current sub-cone according to an expected value of the output signal of the current sub-cone at the current clock cycle and the predicted value at the current clock cycle;
    determining whether the current sub-cone is malfunctioning according to the normal-operation probability; and
    in response to the current sub-cone being malfunctioning, pushing the current sub-cone to a Cone Priority Queue.

* * * * *